(12) United States Patent
Hitzman et al.

(10) Patent No.: US 7,604,741 B1
(45) Date of Patent: Oct. 20, 2009

(54) METHOD FOR ON-SITE PRODUCTION OF NITRATE IONS

(75) Inventors: Donald O. Hitzman, Bartlesville, OK (US); D. Michael Dennis, Bartlesville, OK (US); Bruce Alan Iiams, Anchorage, AK (US)

(73) Assignee: The Lata Group Inc., Ochelata, OK (US)

(*) Notice: Subject to any disclaimer, the term of this patent is extended or adjusted under 35 U.S.C. 154(b) by 0 days.

(21) Appl. No.: 12/395,032

(22) Filed: Feb. 27, 2009

Related U.S. Application Data

(62) Division of application No. 12/125,582, filed on May 22, 2008, now Pat. No. 7,514,058.

(51) Int. Cl.
*C02F 3/00* (2006.01)

(52) U.S. Cl. ............... 210/601; 210/630; 210/192; 210/916

(58) Field of Classification Search ........... 210/192, 210/916, 601, 630
See application file for complete search history.

(56) References Cited

U.S. PATENT DOCUMENTS

| | | | |
|---|---|---|---|
| 3,341,383 A | 9/1967 | Baldwin | |
| 3,874,601 A | 4/1975 | Swanson, Jr. | |
| 4,141,715 A * | 2/1979 | Wyse et al. ........... | 71/58 |
| 4,226,203 A | 10/1980 | Marcin | |
| 4,446,056 A | 5/1984 | Thompson | |
| 4,475,590 A | 10/1984 | Brown | |
| 4,647,589 A | 3/1987 | Valone | |
| 5,478,549 A | 12/1995 | Koch | |
| 7,008,545 B2 | 3/2006 | Cronan et al. | |
| 7,014,828 B2 | 3/2006 | Hero et al. | |
| 7,021,862 B2 | 4/2006 | Hughes | |
| 7,186,341 B2 | 3/2007 | Hunniford et al. | |
| 7,326,340 B2 | 2/2008 | Harshman et al. | |
| 2005/0025692 A1 | 2/2005 | Becher et al. | |
| 2006/0039847 A1 | 2/2006 | Kaboord et al. | |
| 2008/0213157 A1 | 9/2008 | McGrady et al. | |

FOREIGN PATENT DOCUMENTS

RU 1572092 C 10/1994

OTHER PUBLICATIONS http://www.dynonobel.com/dynonobelcom/en/global/aboutus/locations/north_american_locations.htm (downloaded Nov. 19, 2008).
Kirk Othmer Encyclopedia of Chemical Technology (on-line), "Fertilizers", vol. 11, pp. 111-128 (last updated Oct. 17, 2008).

* cited by examiner

*Primary Examiner*—Chester T Barry
(74) *Attorney, Agent, or Firm*—Stephen A. Bent; Foley & Lardner LLP

(57) ABSTRACT

An apparatus and method produces nitrate ions on-site from water, natural gas and air extracted in proximity to the apparatus. The apparatus generates nitrate ions and brings the nitrate ions into contact with an aqueous system. Hydrogen sulfide present in the aqueous system is removed and the production of hydrogen sulfide by sulfate-reducing bacteria (SRB) is eliminated by introducing into the system nitrate ions, whereby denitrifying microorganisms, using nitrate, outcompete the sulfate-reducing bacteria for the available carbon nutrients, thus preventing the SRB from producing hydrogen sulfide. Nitrate ions generated by the apparatus and added to the aqueous system which contains the denitrifying microorganisms can enhance oil recovery by means of microbial enhanced oil recovery mechanisms.

11 Claims, 4 Drawing Sheets

METHOD FOR ON-SITE PRODUCTION OF NITRATE IONS

CROSS-REFERENCE TO RELATED PATENT APPLICATIONS

This application is a Divisional Application of U.S. application Ser. No. 12/125,582 filed May 22, 2008, now U.S. Pat. No. 7,514,058, of which U.S. Pat. Nos. 5,405,531 and 5,750,392 are incorporated by reference in their entirety.

BACKGROUND OF THE INVENTION

1. Field of the Invention

The invention relates to a method and apparatus for on-site production of nitrate ions and bringing the nitrate ions into contact with an aqueous solution, particularly in an aqueous system used in oil-field applications.

2. Background of the Invention

Primary oil recovery generally yields less than 50% of what a given geological structure or reservoir contains. Accordingly, water injection is employed to enhance oil recovery from the porous rock formations that comprise many subterranean oil reservoirs. In enhanced oil recovery, an aqueous system is used to inject a water solution into an oil reservoir. An aqueous system can include above-ground facilities equipped with an apparatus or some facility that collects or distributes aqueous solutions, such as oil wells, oil water separators, water storage tanks, pipelines, and injection wells. The injection process is known to produce hydrogen sulfide ($H_2S$), however, which sours oil reservoirs.

The hydrogen sulfide is produced by sulfate-reducing bacteria, which convert sulfate in the system to sulfide. Such bacteria can arise during the drilling for oil, but they also may be present indigenously, before the drilling. These bacteria and their affect on oil fields are described, for example, by J. R. Postgate, THE SULPHATE-REDUCING BACTERIA $2^{nd}$ ed. (Cambridge University Press, 1984).

The hydrogen sulfide thus evolved causes corrosion of the equipment used to recover the oil and can drastically damage the production capabilities of the oil field and lowers the commercial value of the recovered crude oil. Accordingly, there has been intensive investigation directed at preventing the formation of hydrogen sulfide and/or removing the hydrogen sulfide once it is produced in oil fields.

It is known, for example, that the addition of molybdates will inhibit and/or kill the sulfate-reducing bacteria (SRB), which are responsible for the production of hydrogen sulfide in natural environments, such as sediments. Nevertheless, this method requires that vast amounts of molybdates, e.g., in excess of 3,000 ppm in the water to be treated, be used to effectively control the hydrogen sulfide production by SRB. The use of such large amount of molybdates has the associated disadvantages of high cost, due to the limited availability of molybdates and lower efficiency in saline environments or in other brine environments such as connate waters.

It also is known that the addition of nitrate ions to a system containing SRB will reduce the amount of SRB in the system and thus the amount of hydrogen sulfide formed by SRB. This method relies on strains of *Thiobacillus denitrificans* and other denitrifying microorganisms that are present in oil field waters. For example, hydrogen sulfide present in an aqueous system is removed and the production of hydrogen sulfide by sulfate-reducing bacteria is eliminated by introducing into the system nitrate and nitrate compounds and/or molybdate ions, whereby denitrifying microorganisms out-compete the sulfate-reducing bacteria for the available carbon nutrients, which prevents the SRB from producing hydrogen sulfide.

Nitrate for this purpose is typically formed by oxidizing ammonia or mined by conventional practice, and the resultant nitrate is transported and stored in close proximity to an oil field or other, often remote site for use. Transporting and storing large quantities of nitrate, or mixtures of nitrate with other solutions raises numerous safety and cost issues.

Accordingly, there is a need to provide an economical and effective means to locally produce nitrate ions and bring nitrate ions into contact with an aqueous system in order to prevent the formation of hydrogen sulfide in aqueous systems and remove any existing hydrogen sulfide in the system. Further, there is a need to provide a means to locally produce nitrate ions and bring nitrate ions into contact with an aqueous system which is useful in the recovery of oil which contains a reduced amount of hydrogen sulfide and furthermore will not be susceptible to forming hydrogen sulfide at a point later in the process, so that the system will not adversely affect the equipment used in the process. These and other needs have been solved by the present invention.

SUMMARY OF THE INVENTION

In accordance with the present invention, there is provided a facility where nitrate ions are produced on-site and brought into contact with an aqueous system, comprising an integrated system that is comprised of an extraction device for extracting water and natural gas present in proximity to said facility and extracting oxygen and nitrogen from ambient air present at the facility, and a chemical reactor for processing and reacting the water, natural gas, oxygen and nitrogen to form nitrate ions and a delivery device, interconnecting said integrated system to said aqueous system, for bringing said nitrate ions into contact with the aqueous system.

Pursuant to another aspect of the present invention, a facility is provided where nitrate ions are produced on-site and brought into contact with an aqueous system, comprising an integrated system that is comprised of (i) an extraction device for extracting water and natural gas in proximity to said facility and extracting oxygen and nitrogen from ambient air at the facility, and (ii) a chemical reactor for processing and reacting said water, natural gas, oxygen and nitrogen to form nitrate ions, a delivery device, interconnecting said integrated system to said aqueous system, for bringing said ions into contact with the aqueous system, a controller that is operably connected to each of said extraction device, said chemical reactor, and said delivery device and that is configured to control speed and volume of the nitrate ion production, and a sensor, operably connected to the controller, for monitoring the concentration of said ions in the aqueous system.

According to another aspect, the present invention provides a method for producing nitrate ions locally at a facility and bringing the nitrate ions into contact with an aqueous system in proximity to the facility. The method comprises extracting oxygen and nitrogen from the air in proximity to the facility, acquiring water and natural gas that is present in proximity to the facility, processing and reacting the acquired oxygen, nitrogen, water and natural gas to form nitrate ions and bringing the nitrate ions into contact with the aqueous system in proximity to the facility.

Another aspect of the present invention relates to a method of preventing the formation of hydrogen sulfide in an aqueous system by locally producing nitrate ions at a facility, which method comprises extracting oxygen and nitrogen from the air in proximity to the facility, acquiring water and natural gas that is present in proximity to the facility, processing and reacting the acquired oxygen, nitrogen, water and natural gas to form nitrate ions, bringing said nitrate ions into contact with the aqueous system in proximity to the facility in a concentration sufficient to establish and enhance the growth of denitrifying bacteria, and monitoring the concentration of nitrate ions in the aqueous system.

Yet a further aspect of the invention concerns a method for enhancing oil recovery in an aqueous system by locally producing nitrate ions at a facility. The method comprises the steps of extracting oxygen and nitrogen from the air in proximity to the facility, acquiring water and natural gas that is present in proximity to the facility, processing and reacting the acquired oxygen, nitrogen, water and natural gas to form nitrate ions, bringing said nitrate ions, into contact with the aqueous system in proximity to the facility in a concentration sufficient to enhance oil recovery, and monitoring the concentration of nitrate ions in the aqueous system.

Further objects, features, and advantages of the present invention will become apparent from the detailed description of preferred embodiments that follows.

DETAILED DESCRIPTION OF THE PREFERRED EMBODIMENTS

The present invention can be used anywhere a need exists to control the hydrogen sulfide generation by SRB or to remove preformed hydrogen sulfide in an aqueous system. Hydrogen sulfide corrodes oil recovery processing equipment and can cause severe damage to the oil-recovery capabilities of the equipment, which lowers the market value of the oil produced. In addition, in water treatment applications, the presence of $H_2S$ in pipelines, tanks, and other water handling equipment and facilities must be regulated. The addition of nitrate-based solutions affects both removal of preformed $H_2S$ and in addition prevents further generation of $H_2S$ by SRB, which may be present in the system or may be added later, such as during the drilling operation of oil fields.

Nitrate for this purpose typically is mined or formed by oxidizing ammonia, which, by conventional practice, is transported and stored in close proximity to an oil field or other, often remote site for processing and use. The attendant technical, safety, and cost issues of transporting, blending, and storing nitrate and nitrate solutions are avoided, pursuant to this invention, by providing for the on-site production of nitrate ions by, for example, means of ammonia oxidation.

The apparatus and method of the invention is not limited to $H_2S$ reduction or oil field applications. For example, the present invention can be used to control hydrogen sulfide in oil storage tanks, oil and gas pipelines, cooling tower water, coal slurry pipelines, and other tanks or equipment that contain water or have a water phase. The apparatus and method can also be used in pits or water containment ponds or in water injection systems where water is put underground. In addition, the apparatus and method can be used in the mining industry for metal recovery (waterflooding), landfills, in farming areas to produce fertilizer or various other environmental applications.

Apparatus

Figure 1:
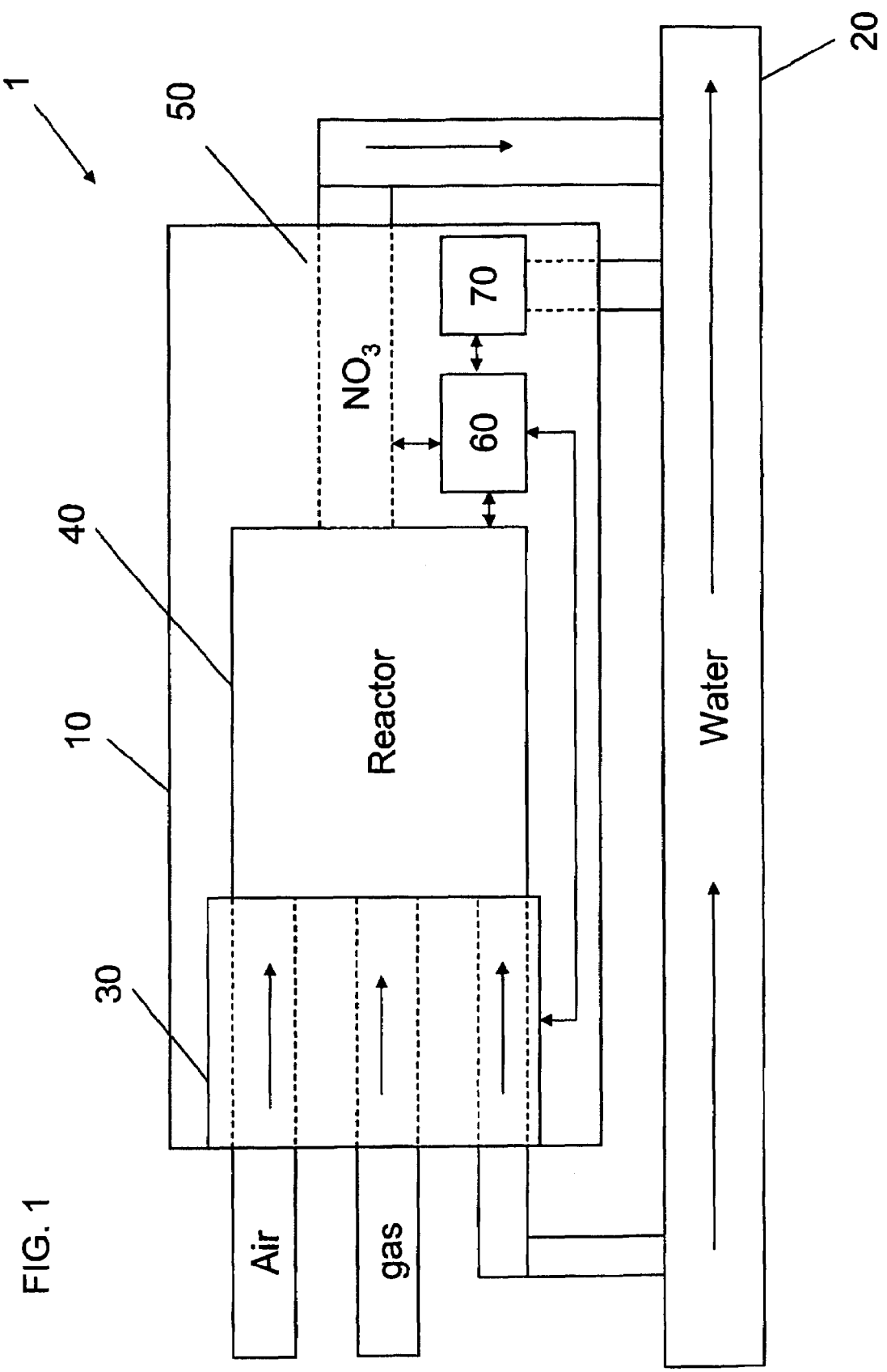
FIG. 1 is a block diagram of a facility where nitrate ions are produced on-site and brought into contact with an aqueous system, according to one embodiment of the present invention.

According to one embodiment, and as shown in FIG. 1, a facility 1 is provided for producing nitrate ions on-site and bringing those ions into contact with an aqueous system 20. An aqueous system 20 can include above-ground facilities equipped with apparatus or equipment that collects or distributes aqueous solutions, such as oil wells, oil-well separators, water storage tanks, pipelines, and injection wells. According to one embodiment, the source of the water present in the aqueous system 20 can be seawater, recycled produced water or aquifer water. According to one embodiment, the aqueous system 20 contains SRB and/or denitrifying microorganisms and sulfide oxidizing microorganisms before nitrate is brought into contact with the aqueous system 20. In an additional embodiment, the aqueous system 20 indigenously comprises a carbon-source nutrient for the denitrifying microorganisms.

The integrated system 10, shown in FIG. 1, comprises an extraction device 30 for extracting water, natural gas, oxygen or oxygen-containing gas and nitrogen (from ambient air) present in proximity to the facility 1. According to one embodiment, the integrated system 10 is relatively small so that it can be transported to and from various aqueous systems 20. For example, the integrated system can be the size of a conventional office desk, approximately three (3) feet high, two (2) feet wide and five (5) feet long. According to another embodiment, the size of the integrated system 10 can be increased or decreased to accommodate the size and requirements of the facility in which it will operate. Further, the integrated system 10 may have wheels and/or skids that allow the integrated system 10 to be transported to various locations.

Figure 2:
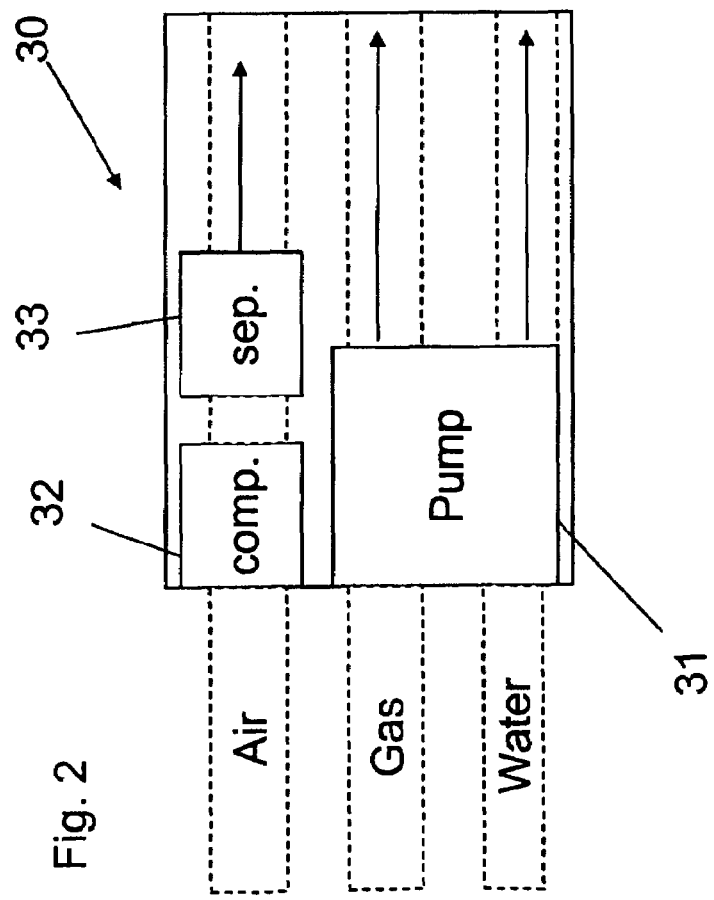
FIG. 2 is a block diagram of an extraction device, according to one embodiment of the present invention.

As shown in FIG. 2, according to one embodiment, the extraction device 30 further comprises a pump 31 for acquiring the natural gas and water, a compressor 32 for extracting ambient air in proximity to the facility 1 and an air separator 33 for extracting nitrogen from the extracted ambient air.

Figure 3:
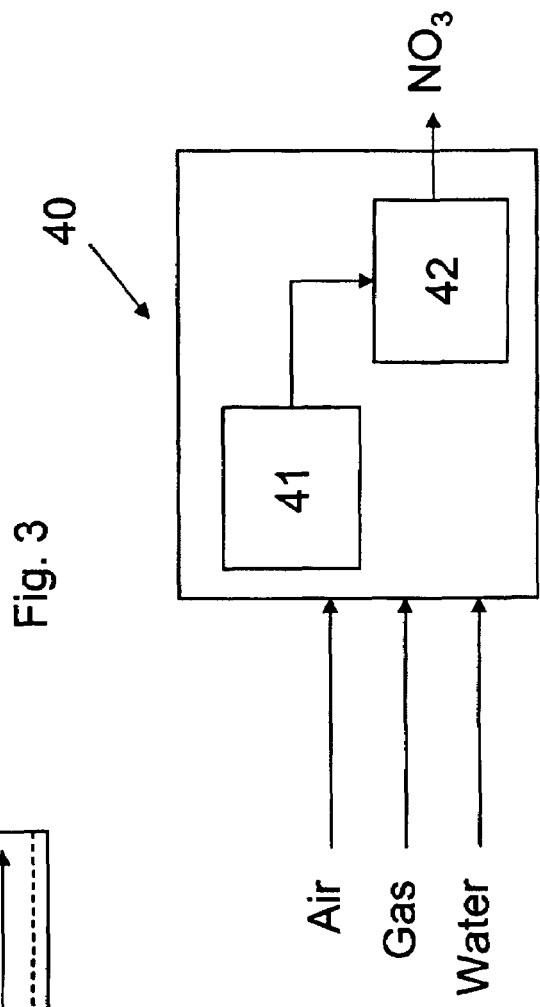
FIG. 3 is a block diagram of a reactor, according to one embodiment of the present invention.

The integrated system 10 also includes a reactor 40 for reacting the oxygen, water, natural gas and nitrogen to form nitrate ions. As shown in FIG. 3, according to one embodiment, the reactor 40 comprises an ammonia reactor 41 for carrying out a Haber-type process and a chemical reactor 42 for carrying out an Ostwald-type process. A Haber-type process may be any process that reacts and processes nitrogen, oxygen, water and natural gas to reduce nitrogen to ammonia, e.g., the Haber process. An Ostwald-type process may be any process that reacts and processes ammonia to obtain nitric oxides, nitric acid and nitrate-nitrite salts, e.g., the Ostwald process.

Figure 4:
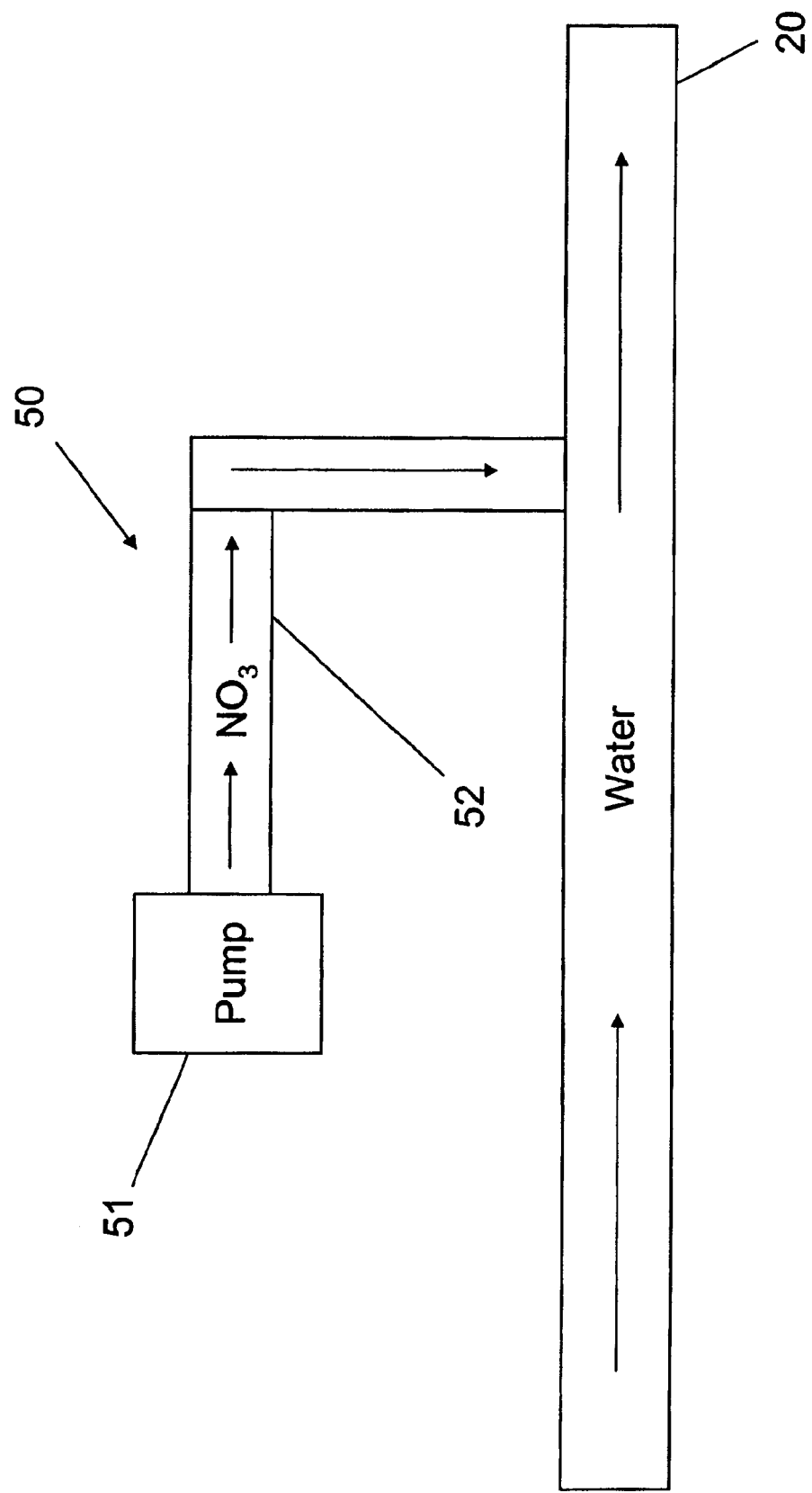
FIG. 4 is a block diagram of a delivery device, according to one embodiment of the present invention.

A delivery device 50, connected to the reactor 40, brings the formed nitrate ions into contact with the aqueous solution. According to one embodiment and as illustrated in FIG. 4, the delivery device 50 comprises a pump 51 for pumping the nitrate ions formed by the reactor 40 through an aqueduct 52 and into the aqueous system 20.

A controller 60 is operably connected to the extraction device 30, the reactor 40 and the delivery device 50. The controller 60 controls the speed and volume of nitrate production. A sensor 70 for monitoring the concentration of nitrate ions in the aqueous system 20 is operably connected to the controller 60.

Method and Operation

Figure 5:
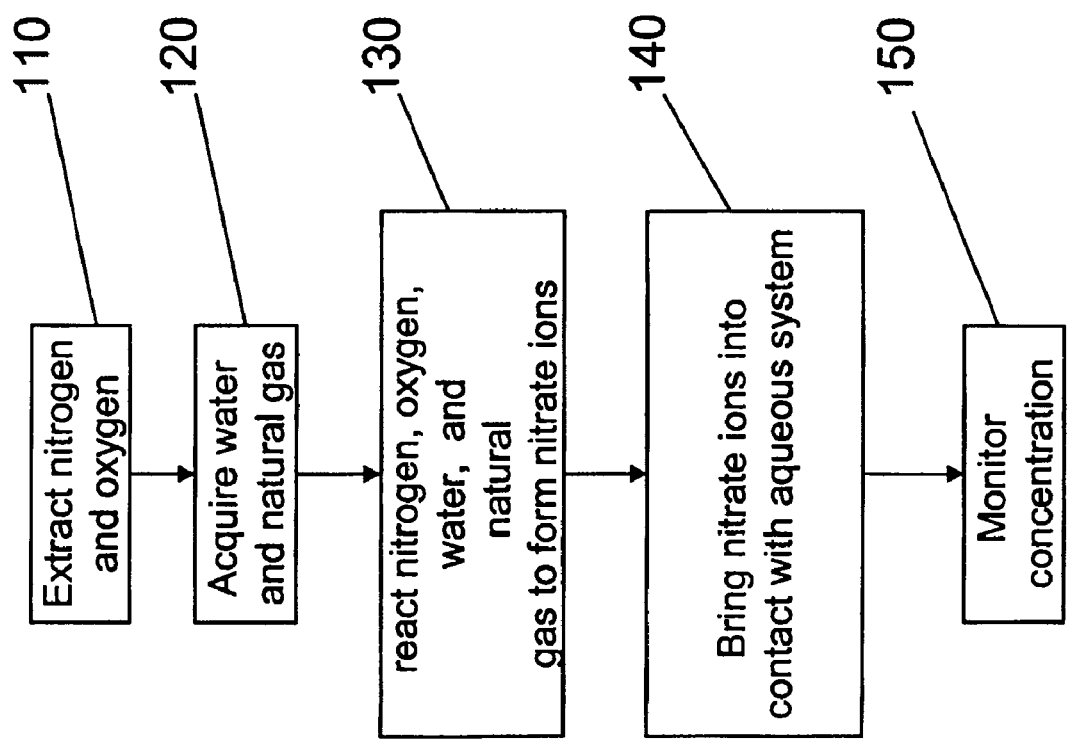
FIG. 5 is a flow chart, illustrating a method for locally producing nitrate ions at a facility, according to one embodiment of the present invention.

A method for on-site production of nitrate ions at the facility 1 and bringing the nitrate ions into contact with an aqueous system 20 in proximity to the facility 1 will now be explained. Preferably, the portable integrated system 10 is placed in proximity to a facility having an aqueous system 20 that requires treatment. According to one embodiment and as shown in FIG. 5, the extraction device 30 of the integrated system 10 extracts oxygen and nitrogen from the air in proximity to the facility 1 (Step 110). In addition, the extraction device 30 acquires an amount of water and natural gas present in proximity to the facility (Step 120).

Using the reactor 40, the integrated system 10 processes and reacts the nitrogen, oxygen, water and natural gas to produce nitrate ions (Step 130). The adsorption process (processing) using air, enriched air or oxygen takes place at temperatures of 0° to 100° C. at gauge pressures of 0 to 20 bar. Preferably, the reactions in the oxidation of ammonia to nitric oxide for the manufacture of nitric acid (the Ostwald-type process) may be operated at temperatures of 750° to 1000° C. (preferably 850° to 950° C.) with gauge pressures of zero to 14 bar. Still, any known process can be used that forms nitrate ions, given nitrogen, oxygen, water, and natural gas as reactants. According to one embodiment, for example, the reactor 40 comprises an ammonia reactor 41 and a chemical reactor 42. Given nitrogen, oxygen, water, and natural gas, the ammonia reactor 41 implements the reduction of nitrogen to ammonia using a Haber-type process to synthesize ammonia. The chemical reactor 42 in turn implements an Ostwald-type process, for carrying out the oxidation or conversion of ammonia to nitric oxides, nitric acid and nitrate-nitrite salts which yields nitrate ions.

As shown in step 140 of FIG. 5, the nitrate ions formed by the reactor 40 then are brought into contact with the aqueous system 20 via a delivery device 50. The nitrate ions may be added to the aqueous system 20 in either a batch or continuous manner. According to one embodiment of the present invention, the aqueous system 20 is contacted with nitrate ions once. In the alternative, the aqueous system 20 is repeatedly treated with the nitrate ions. The choice of treatment methodology is conditioned by the system to be treated. Thus, if a single oil well is to be treated then a single batch injection (although over as much as 3-days) of nitrate and nitrite may be most expedient. If an entire oil-recovery system is to be treated, however, a continuous process may be best.

The nitrate may be added to the system in any desired form. For example, any desired form of the nitrate may be added so long as the nitrate ions will perform their desired function once added to the aqueous system 20. Counter ions, such as calcium, ammonium, sodium or potassium can be used. In addition, compounds which will yield nitrate ions once added to an aqueous system can be used.

The controller 60 and sensor 70 regulate and monitor the concentration of nitrate ions injected into the aqueous solution 20 (Step 150). The application for which the integrated system 10 is being used (e.g., $H_2S$ reduction, enhanced oil recovery) will determine how the controller 60 and sensor 70 will operate. Considerations for $H_2S$ reduction and enhanced oil recovery are discussed in turn below.

Hydrogen Sulfide Reduction

For $H_2S$ reduction pursuant to one aspect of the invention, an important consideration is that enough nitrate ion is added to deny the SRB the carbon source that they need to convert the sulfate to sulfide, by encouraging the growth of denitrifying organisms (denitrifiers), in order that they consume the carbon source utilized by the SRB previously. Accordingly, the amount of nitrate added depends on the amount of carbon-source present in the aqueous system 20 to be treated. For example, if the water to be treated contains 1000 ppm of acetate, which was previously all used by the SRB to convert sulfate to sulfide, enough of the nitrate should be added so that the denitrifying microorganisms consume the 1000 ppm of acetate before the SRB.

The nitrate treatment operates by promoting the growth of denitrifying microorganisms that are usually present in the aqueous system 20 along with the SRB. If these denitrifying microorganisms are not present or not present in an adequate amount, however, they may be added to the aqueous system 20 to be treated along with the nitrate ions. For example, denitrifying organisms can be added to the aqueous system 20 before, concomitant with or after the nitrate ions are brought into contact with the aqueous system 20. They may be added in a batch manner or in a continuous process. Denitrifiers are known to those skilled in the art and are described, for example in "The Prokaryotes: A Handbook on Habitats, Isolation, and Identification of Bacteria", Volumes 1-4 (Springer-Verlag, 1981). These bacteria utilize nitrate or nitrite as a terminal electron acceptor, i.e., gain energy by respiring it as animals do with oxygen. Some of the bacteria convert the nitrate ($NO_3$) to $NO_2$, $N_2O$, and $N_2$, while others convert it to $NH_3$. Denitrifiers can grow on the same carbon/energy source that the SRB utilize and as noted previously, denitrifiers compete more effectively for the carbon/energy sources, thus denying their use for SRB growth and subsequent sulfide formation.

The denitrifying bacteria compete with the SRB for the carbon-based nutrients that are present in the aqueous system 20 or which may be added to the aqueous system 20. That is, both types of microorganisms compete for the same type of nutrients, and due to thermodynamic and physiological considerations, the denitrifying bacteria are much better competitors. Hence, the SRB are left without sufficient carbon source to grow and produce hydrogen sulfide. This lack of carbon nutrient may not kill the SRB directly, but it does not allow the SRB to produce hydrogen sulfide.

If the aqueous system 20 does not currently contain SRB, but there is the potential that the system may in the future contain SRB, then a prophylactic treatment with nitrate and if need be a denitrifier would preclude future SRB activity. In this case, a carbon source may be added along with the denitrifiers so as to encourage the growth of the denitrifiers, thus preventing any SRB which may arise in the future from producing hydrogen sulfide, due to the consumption of available nutrients by the denitrifiers, leaving none for the SRB.

The carbon sources that are present in the system and/or that can be added if need be, in addition to or in place of acetates, propionates, and butyrates, include any known carbon nutrients for denitrifiers. For example, simple carbon/hydrogen compounds such as Krebs cycle intermediates, malonate, citrates, lactates, ethanol, glycerol and the like can be used as nutrients to grow the denitrifying organisms. Most oil fields indigenously contain the necessary carbon sources to grow the denitrifying bacteria. In addition, during production and operation of the oil field, compounds that serve as nutrients are often added. However, additional carbon sources for the denitrifying organisms can be added, along with other desired nutrients such as phosphate salts, in order to affect a nutritional balance that encourages the establishment and growth of the denitrifying organisms.

Accordingly, the present invention can be used to treat a system which contains SRB which are producing hydrogen sulfide, or a system containing hydrogen sulfide due to the presence of SRB in the past, or to treat a system which may contain SRB in the future. This system will remove any preformed hydrogen sulfide and prevent its formation in the future by SRB.

According to another embodiment, in addition to nitrate ions, the reactor 40 produces nitrite ions, nitrogen oxide and other untreated compounds. The nitrite ions, nitrogen oxide, untreated compounds and nitrate ions are all brought into contact with the aqueous system 20. Further, according to one embodiment of the present invention, in addition to nitrate, the method and apparatus injects nitrite and/or molybdate into the aqueous system 20. The addition of both nitrate and nitrite or the combination of nitrate, nitrite, and molybdate affects both removal of preformed $H_2S$ and in addition prevents further generation of $H_2S$ by the SRB, which may be present in the system or may be added later, such as during the drilling operation of oil fields.

The nitrite is added because it helps, in a thermodynamic manner, the growth of the denitrifiers and, hence, of their consumption of the carbon source. In addition, the nitrites react with the preformed hydrogen sulfide made by the SRB, thus immediately lowering the preformed sulfide. The nitrite also acts to inhibit the actions of the SRB in their further production of hydrogen sulfide. Additionally, the nitrites react with the preformed hydrogen sulfide, made by the SRB, immediately lowering the preformed sulfide. Finally, the nitrite inhibits the action of the SRB in their further production of hydrogen sulfide.

The action of the nitrite and nitrate is synergistic. That is, by adding both together, less of both are needed to accomplish the removal of the $H_2S$ and prevention of further $H_2S$ generation by SRB. As previously noted, the appropriate amount of ions added depends on the parameters of the system to be treated, including carbon levels, hydrogen sulfide level, current SRB level, and the like. Those who are knowledgeable in this field, using the principles described above, readily can determine the appropriate amount of ions to be added, taking into consideration that the system should allow the denitrifiers to use up the available carbon sources, thereby to prevent SRB from producing hydrogen sulfide and to remove any preformed hydrogen sulfide.

Enhanced Oil Recovery

According to another embodiment of the invention, the controller 60 determines the concentration of nitrate brought into contact with the aqueous system to carryout enhanced oil recovery, also known as a microbial enhanced oil recovery process (MEOR). The denitrifying microorganisms will act as agents, which will help in the release of oil by mechanisms such as water diversion, biopolymers, biosolvents, biosurfactants, $N_2$ formation, gas production, pH change, and the like during microbial enhanced oil recovery processes (MEOR). That is, the denitrifying bacteria and products of such bacteria cause the release of oil by the above noted mechanisms including water diversion occurring in the high permeability zones directing the water to be preferentially diverted into lower permeability zones, causing the enhanced displacement of oil.

Accordingly, growing the denitrifiers in an aqueous system 20 not only removes hydrogen sulfide and prevents the formation of hydrogen sulfide, but also results in an aqueous system 20 which can be used in MEOR processes. The aqueous system 20 is treated with nitrate ions either before or during the oil-recovering steps so that hydrogen sulfide does not enter the subterranean formation. The aqueous system 20 may then be used in enhanced oil recovery processes, which are known per se. For example, the treated aqueous system 20 is used to inject a subterranean oil-bearing formation to displace oil from the formation.

The aqueous system 20 containing denitrifiers with reduced or no hydrogen sulfide is more effective in recovering oil because the oil does not become sour and there is less corrosion which increases the expense of the operation and ultimately the abandonment of oil-fields. Furthermore, since there is less or no hydrogen sulfide, iron sulfide is not produced by the reaction of hydrogen sulfide with iron. Iron sulfide is undesirable in oil fields because it acts as a plugging agent.

In an additional enhancement, similar to the $H_2S$ reduction application, molybdates and/or nitrite may be added in combination with nitrate to the aqueous system 20. The molybdate serves to kill or inhibit the SRB. Yet, the molybdates are added in such an amount so as not to kill or inhibit the denitrifying bacteria. In addition, when used in combination with the nitrite and nitrate, much less molybdate is required to obtain the desired inhibition of SRB, than in the known process of using molybdates alone to kill and/or inhibit the SRB.

The combination of nitrate and/or nitrite and molybdate thus provides advantages over the known use of molybdate alone. In particular, vast amounts of molybdate are needed if used alone, such as greater than 3000 ppm, whereas only about 1 to about 200 ppm, preferably about 5 to about 100 ppm of molybdate are needed when used in combination with the nitrate and nitrite ions. The molybdate to be added can be in the form of any molybdate salt or compound, which yields molybdate ions. Currently, sodium and lithium molybdate are used due to economic and availability considerations.

Accordingly, the present invention can be used to treat an aqueous system 20 for use in enhanced oil recovery. The present invention reduces the amount of hydrogen sulfide present in subterranean formations, which prevents oil souring and corrosion.

What is claimed is:

1. A method of locally producing nitrate ions at a facility and bringing the nitrate ions into contact with an aqueous system in proximity to the facility, comprising:
   extracting oxygen and nitrogen from the air in proximity to the facility;
   acquiring water and natural gas that is present in proximity to the facility;
   reacting the acquired oxygen, nitrogen, water and natural gas to form nitrate ions; and
   bringing the nitrate ions into contact with the aqueous system in proximity to the facility.

2. The method of claim 1, further comprising the step of monitoring the concentration of nitrate ions in the aqueous system.

3. The method of claim 1, wherein the aqueous system which is contacted with the nitrate ions contains sulfate-reducing bacteria.

4. The method of claim 1, wherein the aqueous system which is contacted with the nitrate ions contains denitrifying microorganisms and sulfide oxidizing microorganisms.

5. The method of claim 1, further comprising adding denitrifying microorganisms to the aqueous system before, concomitant with, or after the nitrate ions are added to the aqueous system.

6. The method of claim 1 which is a batch method, whereby the aqueous system is contacted once with the nitrate ions.

7. The method of claim 1 which is a continuous method, whereby the aqueous system is repeatedly treated with the nitrate ions.

8. The method of claim 1, wherein the aqueous system to be contacted indigenously comprises a carbon-source nutrient for the denitrifying microorganisms.

9. The method of claim 1, wherein a carbon-source nutrient for the denitrifying microorganisms is added to the aqueous system before, concomitant with, or after the nitrate ions are added to the aqueous system.

10. A method of preventing the formation of hydrogen sulfide in an aqueous system by locally producing nitrate ions at a facility, comprising the steps of:
- extracting oxygen and nitrogen from the air in proximity to the facility;
- acquiring water and natural gas that is present in proximity to the facility;
- reacting the acquired oxygen, nitrogen, water and natural gas to form nitrate ions;
- bringing said nitrate ions, into contact with the aqueous system in proximity to the facility in a concentration sufficient to establish and enhance the growth of denitrifying bacteria, and
- monitoring the concentration of nitrate ions in the aqueous system.

11. A method of enhancing oil recovery in an aqueous system by locally producing nitrate ions at a facility, comprising the steps of:
- extracting nitrogen from the air in proximity to the facility;
- acquiring water and natural gas that is present in proximity to the facility;
- reacting the acquired oxygen, nitrogen, water and natural gas to form nitrate ions;
- bringing said nitrate ions, into contact with the aqueous system in proximity to the facility in a concentration sufficient to enhance oil recovery, and
- monitoring the concentration of nitrate ions in the aqueous system.

* * * * *